United States Patent
Yang et al.

(10) Patent No.: US 10,506,572 B2
(45) Date of Patent: Dec. 10, 2019

(54) METHOD AND DEVICE FOR TRANSMITTING DOWNLINK SIGNAL IN WIRELESS COMMUNICATION SYSTEM

(71) Applicant: LG ELECTRONICS INC., Seoul (KR)

(72) Inventors: Suckchel Yang, Seoul (KR); Hanbyul Seo, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 15/316,437

(22) PCT Filed: Jun. 16, 2015

(86) PCT No.: PCT/KR2015/006073
§ 371 (c)(1),
(2) Date: Dec. 5, 2016

(87) PCT Pub. No.: WO2015/194825
PCT Pub. Date: Dec. 23, 2015

(65) Prior Publication Data
US 2017/0201967 A1 Jul. 13, 2017

Related U.S. Application Data

(60) Provisional application No. 62/012,961, filed on Jun. 16, 2014.

(51) Int. Cl.
*H04W 72/04* (2009.01)
*H04L 5/00* (2006.01)
*H04L 5/14* (2006.01)

(52) U.S. Cl.
CPC ......... *H04W 72/042* (2013.01); *H04L 5/006* (2013.01); *H04L 5/0073* (2013.01); *H04L 5/14* (2013.01);
(Continued)

(58) Field of Classification Search
CPC . H04L 5/006; H04L 5/14; H04L 27/26; H04L 5/00; H04W 72/042;
(Continued)

(56) References Cited

U.S. PATENT DOCUMENTS

2011/0292826 A1* 12/2011 Ahn .................. H04W 52/16
370/252
2014/0023004 A1 1/2014 Kumar et al.
(Continued)

FOREIGN PATENT DOCUMENTS

CN 103563284 A 2/2014
CN 103563317 A 2/2014
(Continued)

OTHER PUBLICATIONS

Huawei et al., "Discussion on network listening with eIMTA," 3GPP TSG RAN WG1 Meeting #76bis, R1-141130, Shenzhen, China, Mar. 31-Apr. 4, 2014 (downloaded on Mar. 22, 2014), 3 pages.
(Continued)

*Primary Examiner* — Kyaw Z Soe
(74) *Attorney, Agent, or Firm* — Birch, Stewart, Kolasch & Birch, LLP

(57) ABSTRACT

The present invention relates to a wireless communication system and, more particularly, to a method and a device for receiving a DL signal, by a terminal, in an FDD cell comprising a DL CC and a UL CC, the method comprising the steps of: receiving SF reconfiguration information about a UL CC; and receiving DL data on an FDD cell, wherein, if the DL data is received in a DL SF on the DL CC, the DL data is processed by means of an OFDM mode and, if the DL data is received in a DL SF reconfigured from a UL SF on
(Continued)

the basis of the SF reconfiguration information on the UL CC, the DL data is processed by means of an SC-FDM mode.

8 Claims, 12 Drawing Sheets

(52) U.S. Cl.
CPC ......... *H04L 5/143* (2013.01); *H04W 72/0446* (2013.01); *H04L 5/001* (2013.01); *H04L 5/0044* (2013.01); *H04L 5/0051* (2013.01); *H04L 5/0053* (2013.01)

(58) Field of Classification Search
CPC ......... H04W 72/0446; H04W 28/0278; H04W 72/12; H04W 72/1263; H04W 72/1268; H04W 72/1273; H04W 74/02
See application file for complete search history.

(56) References Cited

U.S. PATENT DOCUMENTS

| | | | |
|---|---|---|---|
| 2014/0126485 A1* | 5/2014 | Chen | H04L 5/0053 370/329 |
| 2014/0126490 A1* | 5/2014 | Chen | H04L 5/0048 370/329 |
| 2014/0161002 A1* | 6/2014 | Gauvreau | H04W 16/24 370/280 |
| 2015/0078279 A1* | 3/2015 | Ko | H04W 76/14 370/329 |
| 2015/0200752 A1* | 7/2015 | Yin | H04L 1/1887 370/280 |
| 2015/0304994 A1* | 10/2015 | Kim | H04L 5/0048 370/280 |
| 2015/0326373 A1* | 11/2015 | Ryu | H04L 5/0053 370/330 |
| 2016/0254948 A1* | 9/2016 | Chen | H04W 72/0446 370/254 |
| 2016/0302051 A1* | 10/2016 | Lindoff | H04W 76/14 |
| 2016/0337109 A1* | 11/2016 | Yasukawa | H04W 72/1289 |
| 2016/0381561 A1* | 12/2016 | Yang | H04W 16/02 370/329 |
| 2017/0034808 A1* | 2/2017 | Ouchi | H04W 72/042 |
| 2017/0118745 A1* | 4/2017 | Nogami | H04W 72/0446 |
| 2017/0171897 A1* | 6/2017 | Ryu | H04L 5/0044 |

FOREIGN PATENT DOCUMENTS

| | | |
|---|---|---|
| WO | WO 2013/162333 A1 | 10/2013 |
| WO | WO 2014/046502 A1 | 3/2014 |

OTHER PUBLICATIONS

LG Electronics, "CA-based aspects for FDD-TDD joint operation," 3GPP TSG RAN WG1 Meeting #74, R1-133372, Barcelona, Spain, Aug. 19-23, 2013 (downloaded on Aug. 10, 2013), 3 pages.

LG Electronics, "Remaining Details of UL/DL Reconfiguration Signaling in TDD eIMTA," 3GPP TSG RAN WG1 Meeting #76, R1-140298, Prague, Czech Republic, Feb. 10-14, 2014 (downloaded on Feb. 1, 2014), pp. 1-4.

Samsung, "Signaling for TDD UL-DL Reconfiguration," 3GPP TSG RAN WG1 #76, R1-140348, Prague, Czech Republic, Feb. 10-14, 2014 (downloaded on Feb. 1, 2014), pp. 1-4.

* cited by examiner

PUCCH format 1a and 1b structures (Normal CP case)

PUCCH formats 2, 2a, and 2b structures (Normal CP case)

METHOD AND DEVICE FOR TRANSMITTING DOWNLINK SIGNAL IN WIRELESS COMMUNICATION SYSTEM

CROSS REFERENCE TO RELATED APPLICATIONS

This application is the National Phase of PCT International Application No. PCT/KR2015/006073, filed on Jun. 16, 2015, which claims priority under 35 U.S.C. 119(e) to U.S. Provisional Application No. 62/012,961, filed on Jun. 16, 2014, all of which are hereby expressly incorporated by reference into the present application.

TECHNICAL FIELD

The present invention relates to a wireless communication system and, more particularly, to a method and apparatus for transmitting a downlink signal.

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmission power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE OF THE INVENTION

Technical Task

An object of the present invention is to provide a method and apparatus for transmitting/receiving a downlink signal in a wireless communication system.

It will be appreciated by persons skilled in the art that the objects that could be achieved with the present invention are not limited to what have been particularly described hereinabove and the above and other objects that the present invention could achieve will be more clearly understood from the following detailed description taken in conjunction with the accompanying drawings.

Technical Solutions

In one aspect of the present invention, provided herein is a method for a user equipment to receive a DL signal through an FDD (Frequency Division Duplex) cell including a UL CC (Uplink Component Carrier) and a DL (Downlink) CC in a wireless communication system, the method including receiving SF (Subframe) reconfiguration information about the UL CC, wherein the SF reconfiguration information indicates a UL SF set reconfigured as a DL SF on the UL CC; and receiving DL data on the FDD cell, wherein if the DL data is received in a DL SF on the DL CC, the DL data is processed according to an OFDM (Orthogonal Frequency Division Multiple) scheme and wherein if the DL data is received in a DL SF reconfigured from a UL SF on the UL CC according to the SF reconfiguration information, the DL data is processed according to an SC-FDM (Single Carrier Frequency Division Multiple) scheme.

In another aspect of the present invention, provided herein is user equipment configured to receive a DL signal through an FDD cell including a UL CC (Uplink Component Carrier) and a DL (Downlink) CC, the user equipment including an RF (Radio Frequency) unit; and a processor, wherein the processor is configured to receive SF (Subframe) reconfiguration information about the UL CC, the SF reconfiguration information indicating a UL SF set reconfigured as a DL SF on the UL CC, and receive DL data on the FDD cell, wherein if the DL data is received in a DL SF on the DL CC, the DL data is processed according to an OFDM (Orthogonal Frequency Division Multiple) scheme, and wherein if the DL data is received in a DL SF reconfigured from a UL SF on the UL CC according to the SF reconfiguration information on the UL CC, the DL data is processed according to an SC-FDM (Single Carrier Frequency Division Multiple) scheme.

Preferably, provided herein is a method that, if the DL data is received in the DL SF on the DL CC, a DMRS (Demodulation Reference Signal) for the DL data is mapped by being distributed within the DL SF and wherein if the DL data is received in the reconfigured DL SF on the UL CC, the DMRS for the DL data is mapped contiguously to a specific transmission symbol in the reconfigured DL SF.

Preferably, provided herein is a method, the method further including receiving a PDCCH (Physical Downlink Control Channel) including scheduling information about the DL data, wherein if the PDCCH is received in the DL SF on the DL CC, the PDCCH is mapped to first P transmission symbols in the DL SF and wherein if the PDCCH is received in the reconfigured DL SF on the UL CC, the PDCCH is mapped to an adjacent transmission symbol of the specific transmission symbol having the DMRS contiguously mapped thereto in the reconfigured DL SF.

Preferably, provided herein is a method, the method including further receiving CSI-RS (Channel State Information RS) on the FDD cell, wherein if the CSI-RS is received in the DL SF on the DL CC, the CSI-RS is mapped by being distributed within the DL SF and wherein if the CSI-RS is received in the reconfigured DL SF on the UL CC, the CSI-RS is mapped to a last transmission symbol in the reconfigured DL SF.

Advantageous Effects

According to embodiments of the present invention, control information can be efficiently transmitted/received in a wireless communication system.

It will be appreciated by persons skilled in the art that the effects that could be achieved with the present invention are not limited to what has been particularly described hereinabove and these and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates an FDD eIMTA (Frequency Division Duplex enhanced Interference Mitigation and Traffic Adaptation) scheme; and.

BEST MODE FOR INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
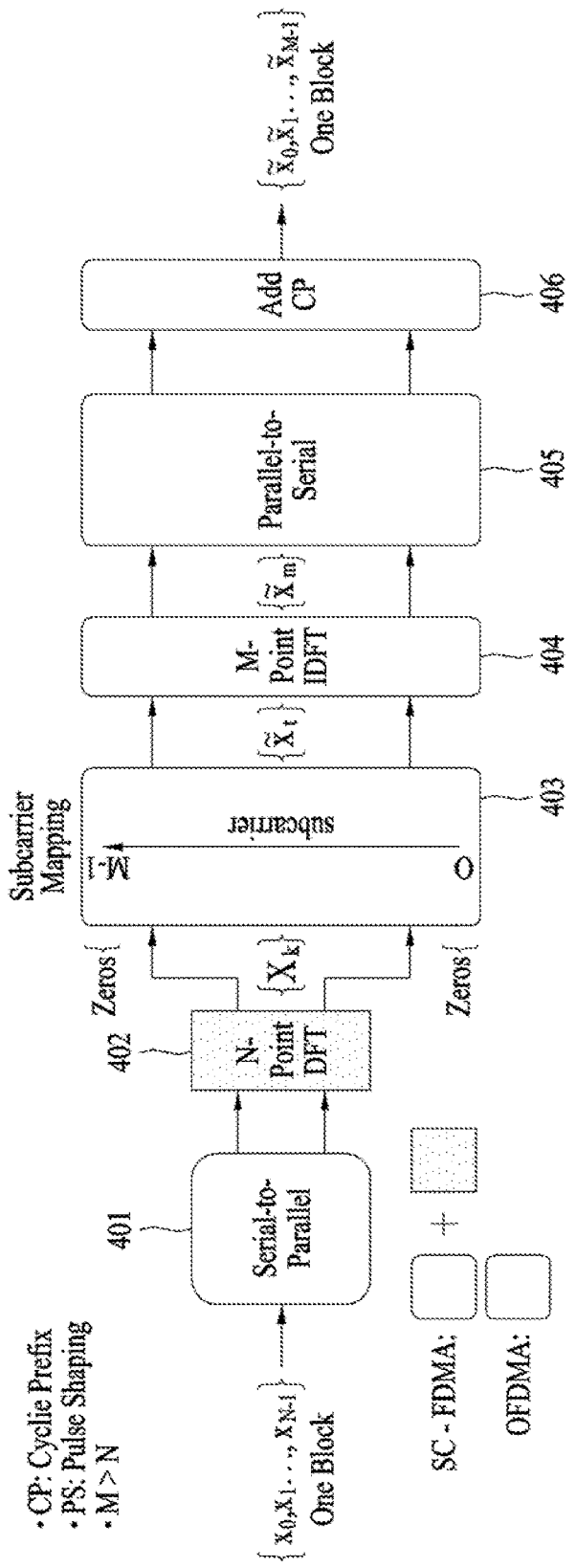
FIG. 1 illustrates SC-FDMA and OFDMA schemes.

FIG. 1 illustrates SC-FDMA and OFDMA schemes. SC-FDMA and OFDMA are interchangeably used with SC-FDM and OFDM, respectively. FIG. 1 is illustrated in terms of a signal processing of a transmitter, and a signal processing of a receiver is performed in reverse order reverse to that show in of FIG. 1.

Referring to FIG. 1, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Figure 2:
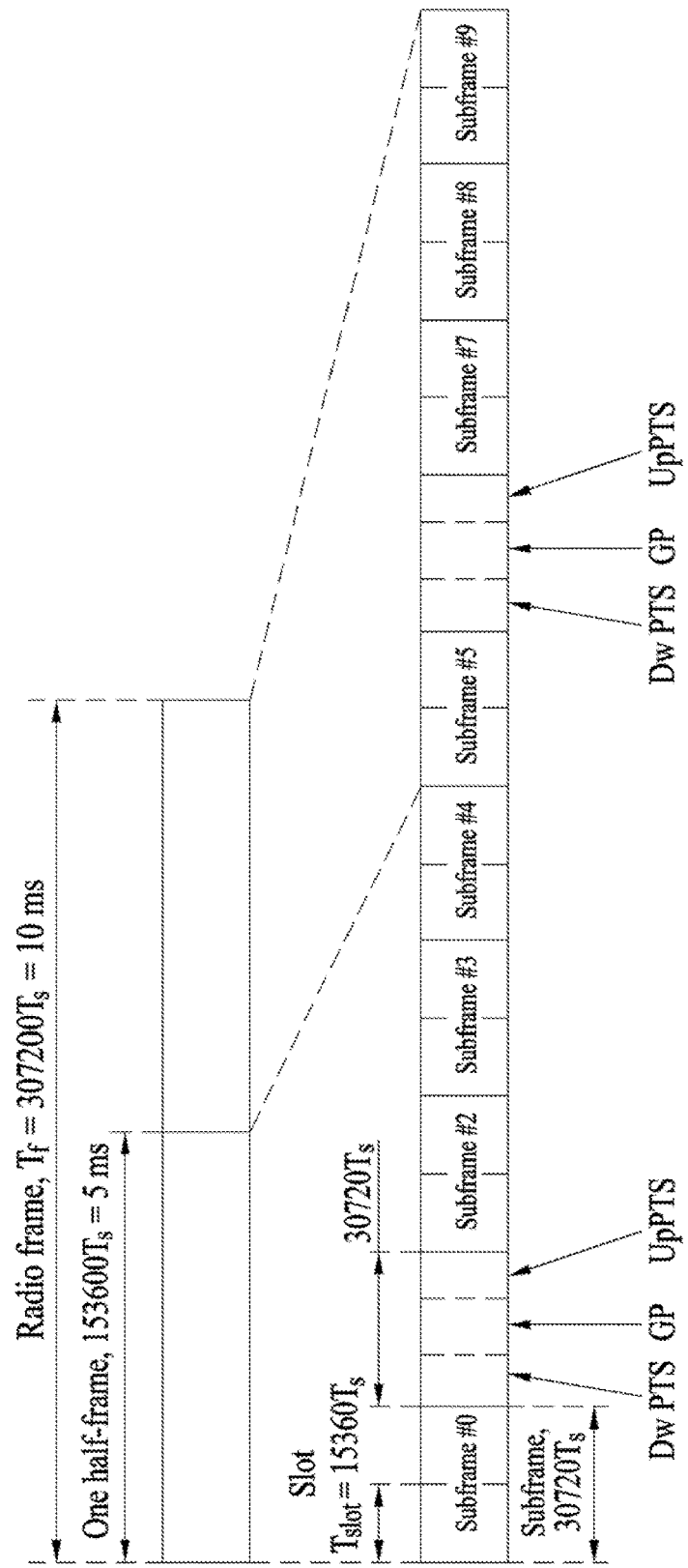
FIG. 2 illustrates a radio frame structure.

FIG. 2 illustrates a radio frame structure.

FIG. 2(a) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain FIG. 2(b) illustrates a type-2 radio frame structure for time division duplex (TDD). The type-2 radio frame includes 2 half frames. Each half frame includes 5 subframes each of which includes 2 slots.

Table 1 shows UL-DL configurations (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 3:
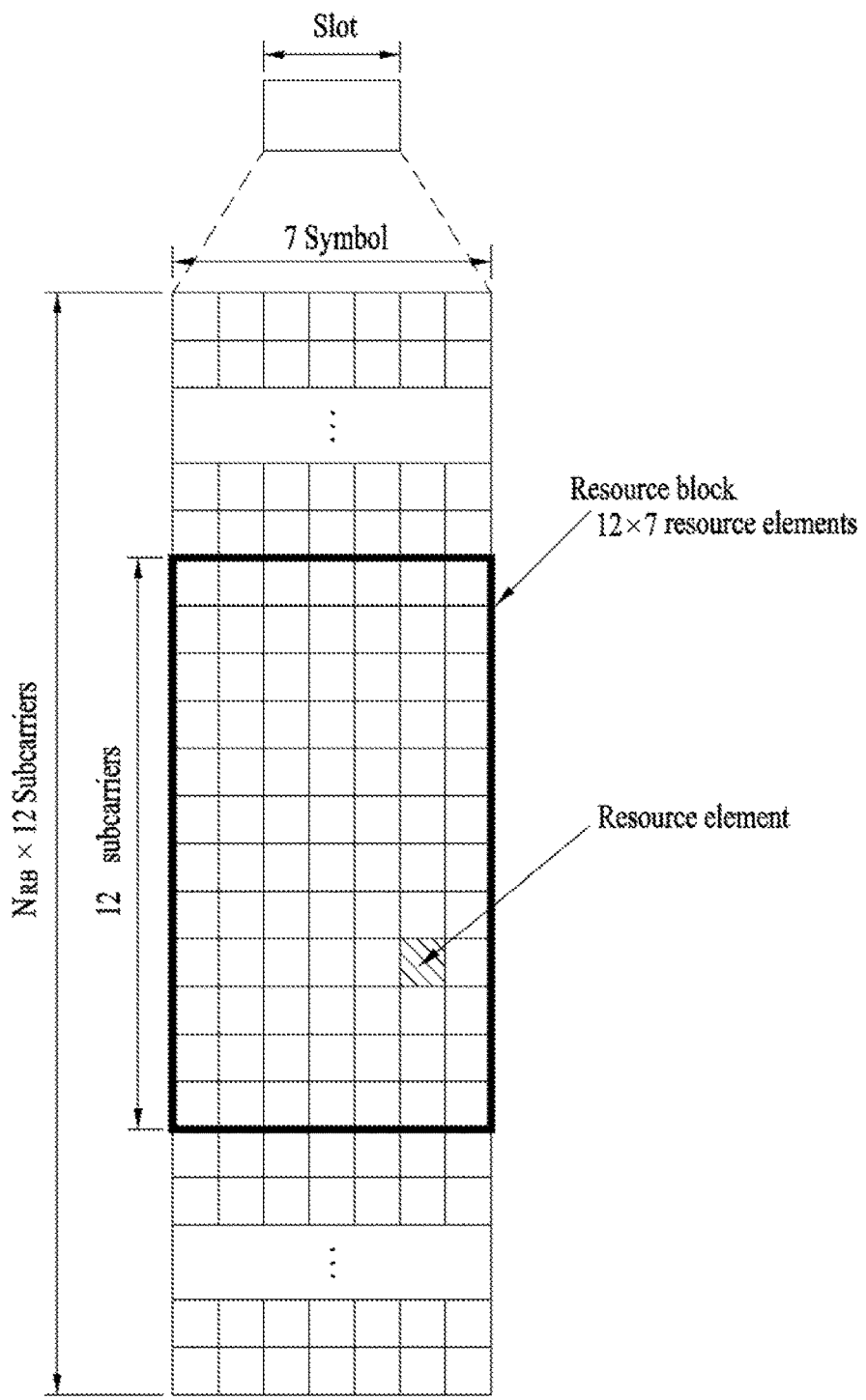
FIG. 3 illustrates a resource grid of a downlink slot.

FIG. 3 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols. An OFDM(A) symbol and an SC-FDM(A) symbol are referred to as transmission symbols.

Figure 4:
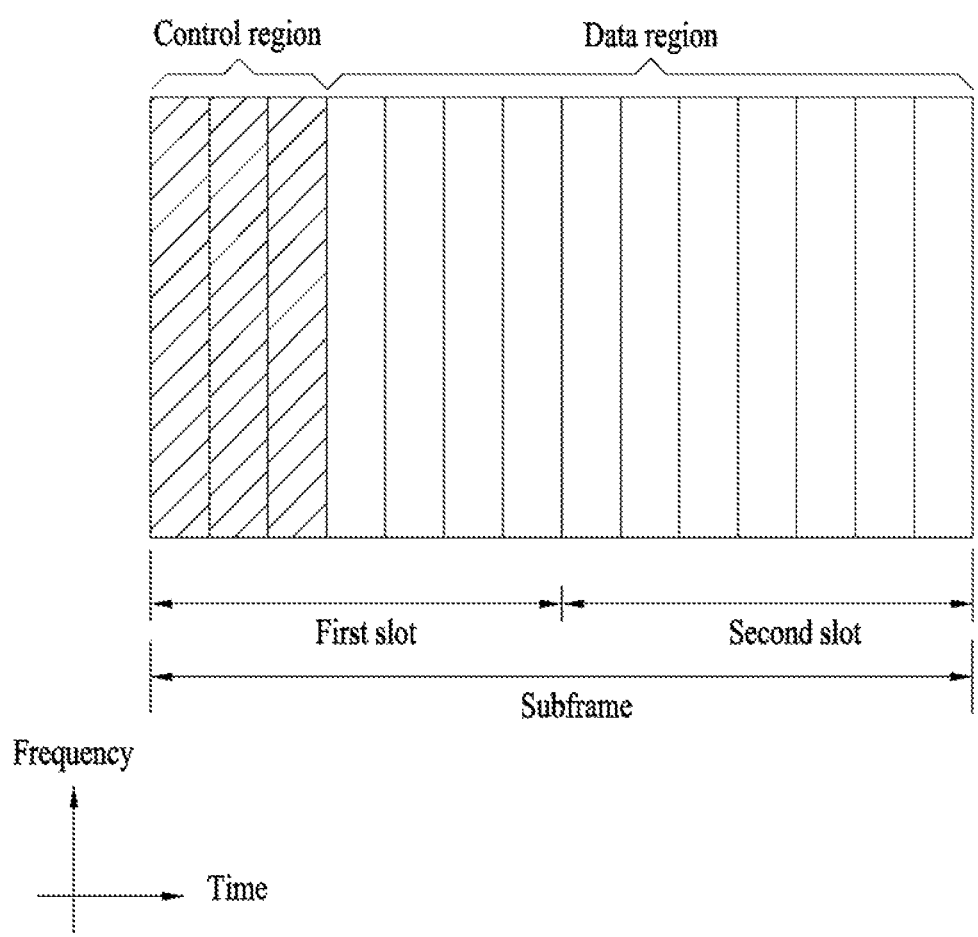
FIG. 4 illustrates a downlink subframe structure.

FIG. 4 illustrates a DL subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

The PDCCH carries a message known as DCI, and a plurality of PDCCHs are generally transmitted at a subframe. Each PDCCH is transmitted using one or more control channel elements (CCEs), each of which corresponds to nine REGs. One REG corresponds to four resource elements (REs). Four QPSK symbols are mapped into each REG. A resource element (RE) reserved by the reference signal (RS) is not included in the REG. Therefore, a total number of REGs within given OFDM symbols are varied depending on the presence of a cell-specific reference signal. The REG concept is also used for other downlink control channels (that is, PDFICH and PHICH). Four PDCCH formats are supported as listed in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are used by being numbered continuously. In order to simplify a decoding process, the PDCCH having a format that includes n number of CCEs may start from only CCE having a number equivalent to a multiple of n. The number of CCEs used for transmission of a specific PDCCH is determined by the BS in accordance with a channel state. For example, if the PDCCH is for a UE having a good downlink channel (for example, adjacent to BS), one CCE may be required. However, in case of a UE having a poor channel (for example, adjacent to the cell edge), eight CCEs may be required to obtain sufficient robustness. Also, a power level of the PDCCH may be adjusted to correspond to the channel state.

The LTE system defines a set of CCEs, where the PDCCH may be located for each UE. The set of CCEs, where the UE may discover its PDCCH, may be referred to as a search space (SS). Individual resources within the search space, to which the PDCCH may be transmitted, will be referred to as PDCCH candidates. One PDCCH candidate corresponds to 1, 2, 4, or 8 CCEs depending on a CCE aggregation level. The BS transmits actual PDCCH (DCI) onto a random PDCCH candidate within the search space, and the UE monitors the search space to discover PDCCH (DCI). In more detail, the UE tries blind decoding (BD) for the PDCCH candidates within the search space.

In the LTE, the search space for each PDCCH format may have different sizes. A dedicated SS (or UE-specific SS, USS) and a common search space are defined. The USS is configured separately for each UE, and the range of the CSS is notified to all UEs. The USS and the CSS may be overlapped for the given UE.

Since the search spaces (SSs) may be configured in small size and may overlap each other, it may be impossible for the BS to search for CCE resources for transmitting a PDCCH to all desired UEs within a given subframe. That is, since CCE resources have already been allocated to other UEs, CCE resources for a specific UE may no longer be present in a search space of the specific UE (blocking). In order to minimize the possibility of blocking to be sustained at the next subframe, a UE-specific hopping sequence is applied to the start position of the dedicated search space. Table 3 illustrates sizes of the common and dedicated search spaces.

TABLE 3

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

Figure 5:
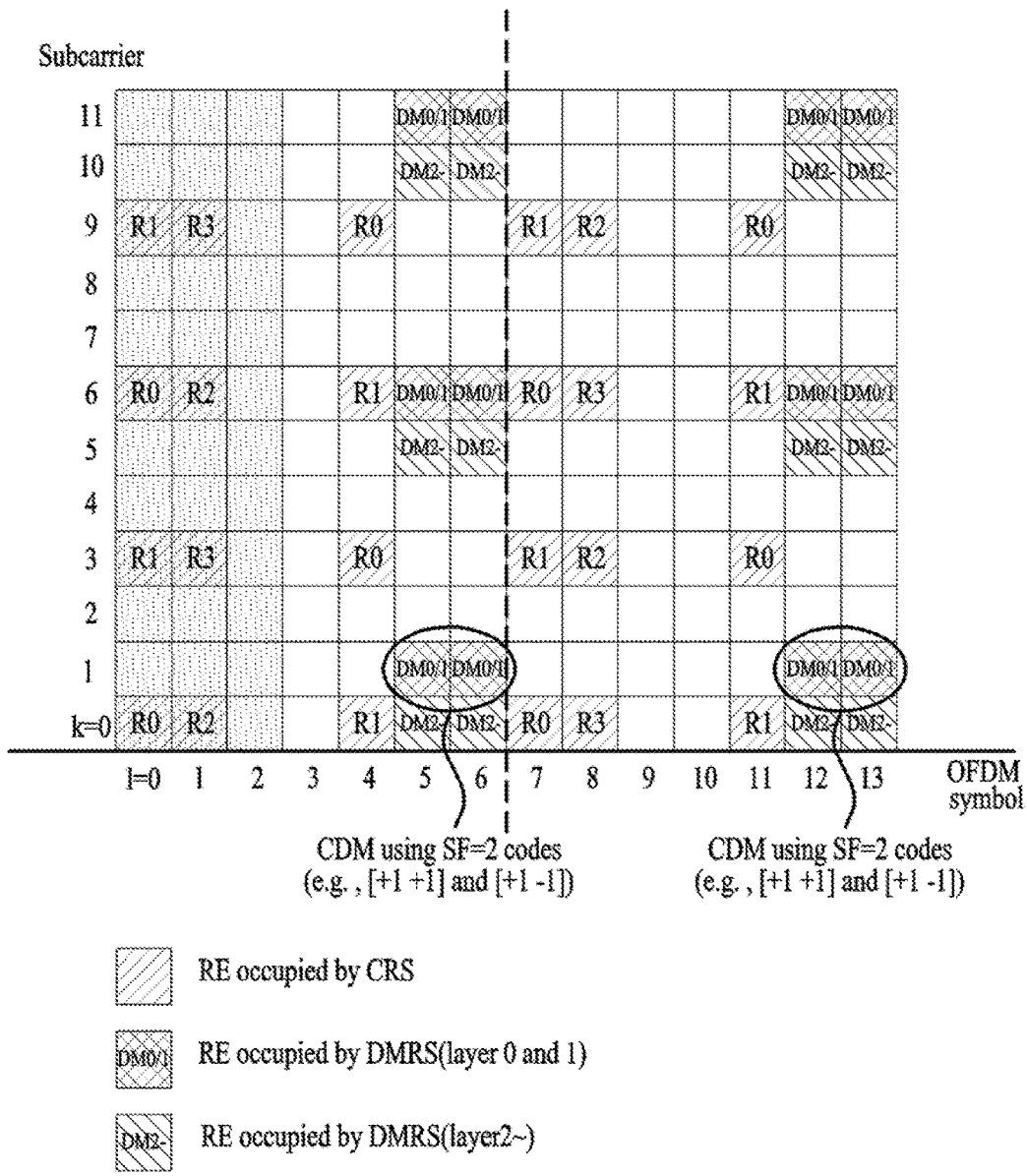
FIG. 5 illustrates examples of a structures of a cell-specific reference signal (CRS) and a structure of a demodulation reference signal (DMRS)

FIG. 5 illustrates examples of a CRS (Cell-specific Reference Signal) and a DMRS (Demodulation Reference Signal). The DMRS is also referred to as a UE-specific RS.

Referring to FIG. 5, the CRS is transmitted through maximum 4 antenna ports (e.g., R0 to R3), and used for both channel state measurement and data demodulation. The CRS is transmitted without being precoded, and transmitted per subframe on a full-band. The DMRS is a user equipment-specific reference signal used to demodulate a signal of each layer in transmitting a signal using multiple antennas. The DMRS is used for PDSCH demodulation, and precoded like a layer. The DMRS is transmitted only on RB(s) having PDSCH mapped thereto in a subframe scheduled for the PDSCH. An LTE-A system supports maximum 8 layers and respective DMRSs therefor. The respective DMRSs share the same RE, and are multiplexed according to CDM (Code Division Multiplexing). In particular, the DMRSs for each layer is spread using a spread code (e.g., a Walsh code, an orthogonal code such as a DFT code) and then multiplexed on the same RE. For example, a DMRS for a layer 0 may be spread using [+1+1], and a DMRS for a layer 1 may be spread using [+1−1]. Similarly, a DMRS for a layer 2 and a DMRS for a layer 3 are spread on a same RE using orthogonal codes different from each other. DMRSs for layers 4, 5, 6, and 7 are spread on an RE occupied by DMRSs 0 and 1 and RE occupied by DMRS 2 and 3 using the existing codes orthogonal to the layers 0, 1, 2, and 3. Up to 4 layers, a code "SF=2" is used for DMRS, and a code "SF=4" is used for DMRS from 5 or more layers. Antenna port for DMRS includes {7, 8, . . . , n+6} (where, "n" indicates the number of layers).

Figure 6:
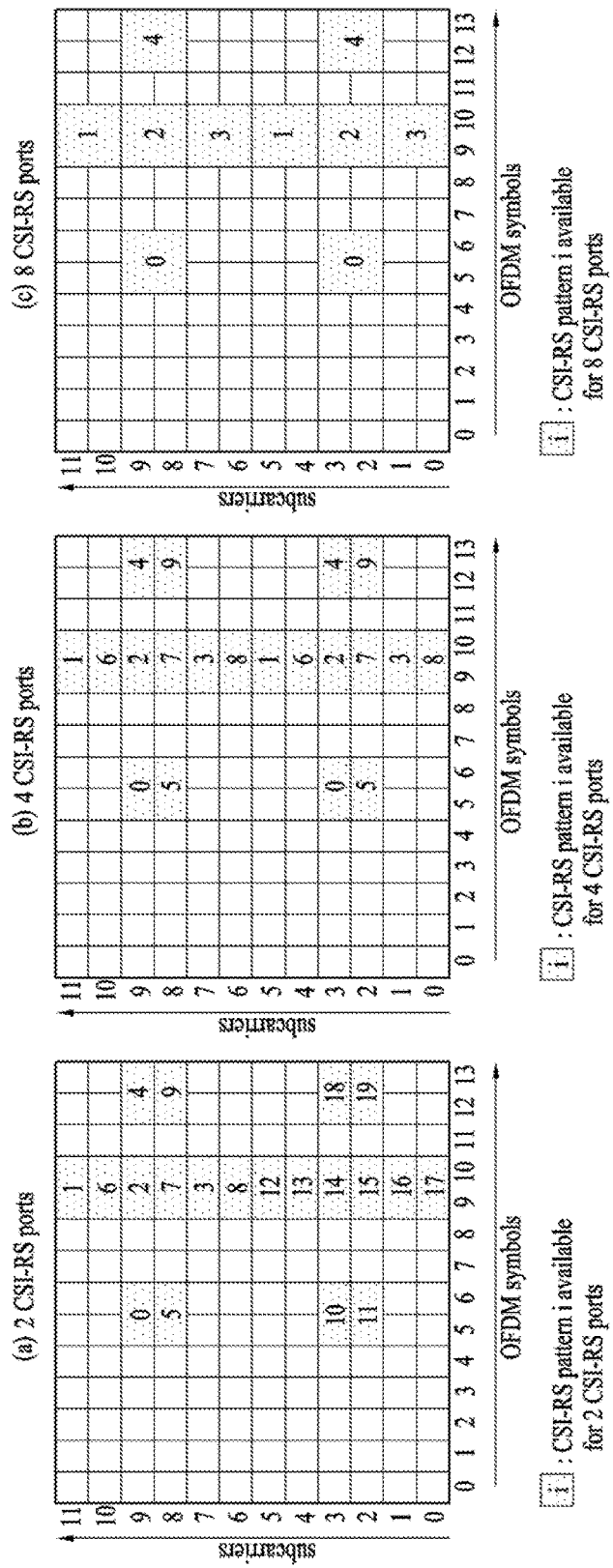
FIG. 6 illustrates an example of a Channel State Information Reference Signal (CSI-RS)

FIG. 6 illustrates an example of a CSI-RS (Channel Status Information Reference Signal). The CSI-RS is used to obtain channel state information. The CSI-RS is transmitted in every prescribed transmission period. A CSI-RS transmission subframe (hereinafter, referred to as "CSI-RS subframe") is determined by a CSI-RS transmission period and a CSI-RS subframe offset. The CSI-RS transmission period and the CSI-RS subframe offset are given by CSI-RS subframe configuration information. FIG. 6 (a) shows 20 types of CSI-RS configurations 0 to 19 usable for CSI-RS transmissions by 2 CSI-RS ports, FIG. 6 (b) shows 10 types of CSI-RS configurations 0 to 9 usable by 4 CSI-RS ports, and FIG. 6(c) shows 5 types of CSI-RS configurations 0 to 4 usable by 8 CSI-RS ports. The CSI-RS ports correspond to 15 to 22, respectively.

Figure 7:
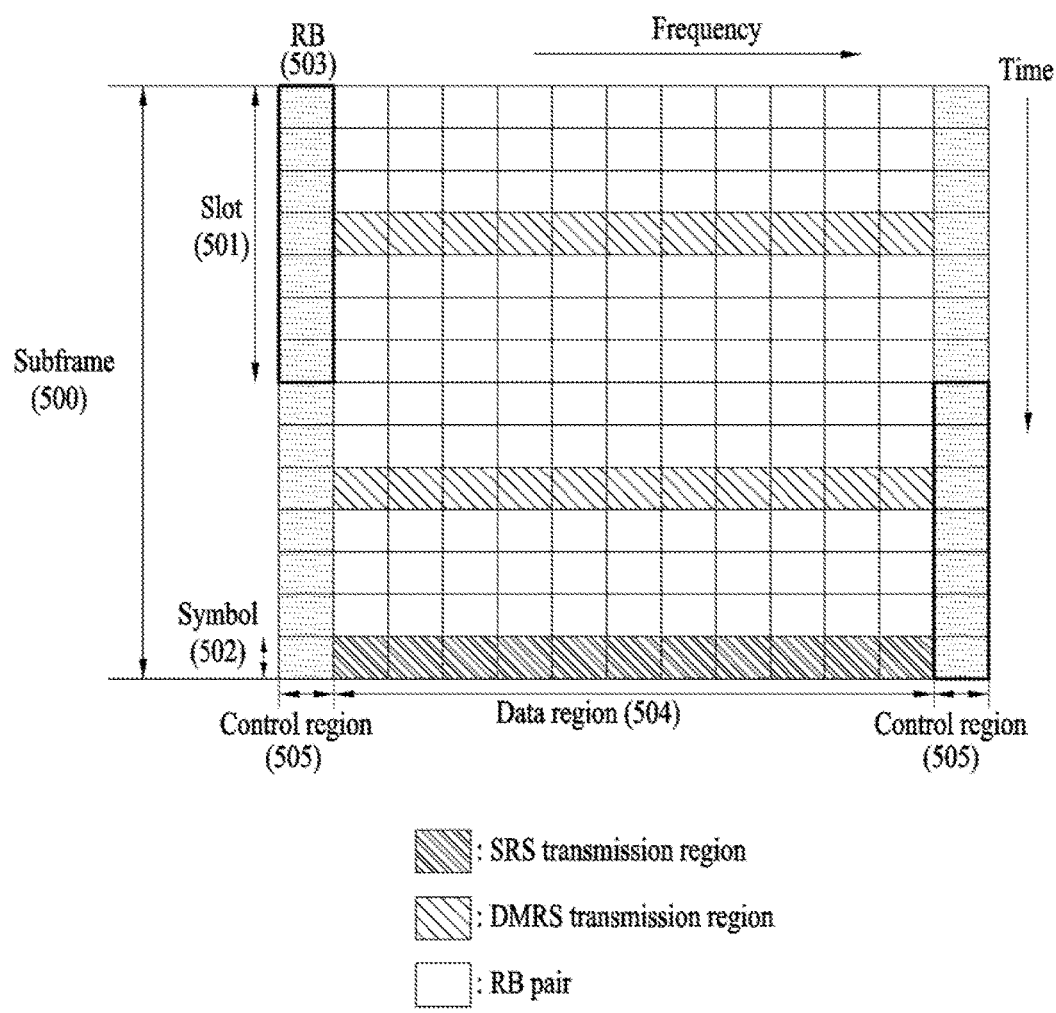
FIG. 7 illustrates the structure of an uplink subframe.

FIG. 7 illustrates the structure of an uplink subframe.

Referring to FIG. 7, a subframe 500 having a length of 1 ms which is a basic unit of uplink transmission includes two slots 501 each having a length of 0.5 ms. In the case of a length of a normal Cyclic Prefix (CP), each slot includes seven symbols 502 and one symbol corresponds to one Single carrier-Frequency Division Multiple Access (SC-FDMA) symbol. An RB 503 is a resource allocation unit corresponding to 12 subcarriers in a frequency domain and one slot in a time domain. The structure of the uplink subframe of the LTE system is roughly divided into a data region 504 and a control region 505. The data region refers to communication resources used for data transmission, such as voice or packets transmitted to each UE, and includes a physical uplink shared channel (PUSCH). The control region refers to communication resources used to transmit an uplink control signal such as a downlink channel quality report from each UE, reception ACK/NACK of a downlink signal, an uplink scheduling request or the like, and includes a Physical Uplink Control Channel (PUCCH). A sounding reference signal (SRS) is transmitted through a last SC-FDMA symbol of one subframe on a time axis. SRSs of several UEs transmitted through the last SC-FDMA of the same subframe are distinguished according to a frequency position/sequence.

Figure 8:
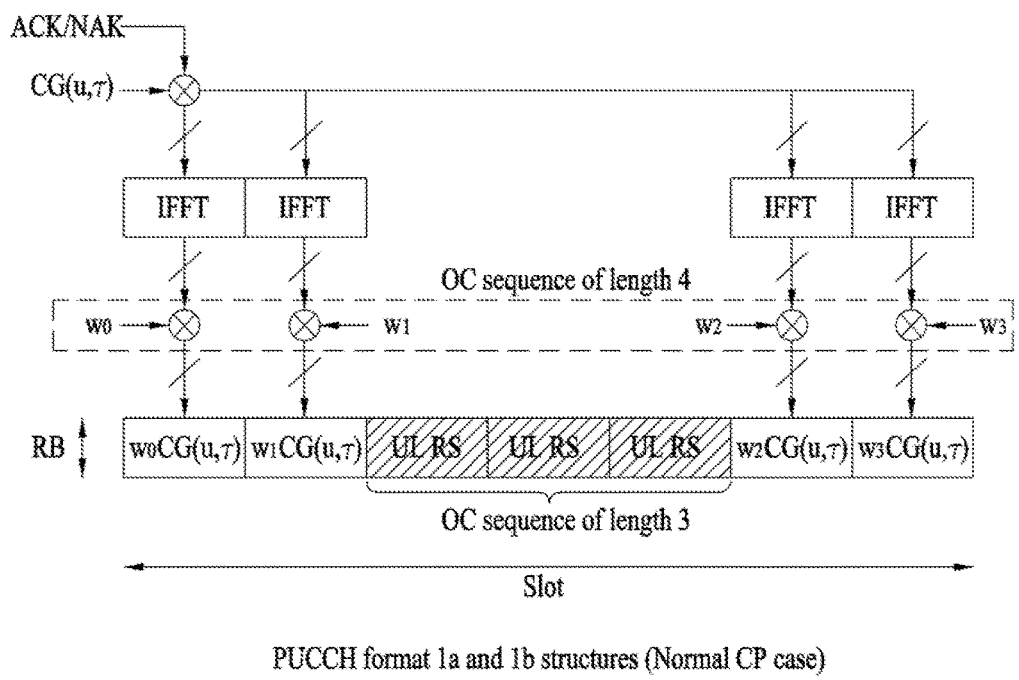
FIG. 8 illustrates slot level structures of PUCCH formats 1a and 1b.
Figure 9:
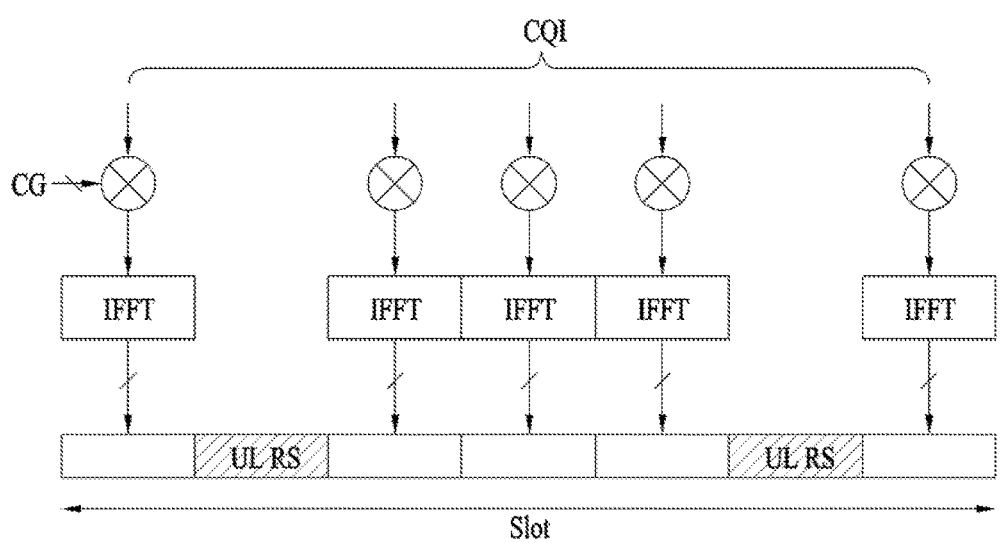
FIG. 9 illustrates slot level structures of PUCCH formats 2/2a/2b.

FIGS. 8 to 9 illustrate slot level structures of PUCCH formats. A PUCCH has the following formats in order to transmit control information.

(1) Format 1: on-off keying (OOK) modulation, used for scheduling request (SR)

(2) Formats 1a and 1b: used for ACK/NACK transmission
1) BPSK ACK/NACK for one codeword
2) Format 1b: QPSK ACK/NACK for two codewords (3) Format 2: QPSK modulation, used for CQI transmission (4) Formats 2a and 2b: used for simultaneous transmission of CQI and ACK/NACK Table 4 shows modulation schemes according to PUCCH format and the number of bits per subframe. Table 5 shows the number of RSs per slot according to PUCCH format and Table 6 shows SC-FDMA symbol position in an RS according to PUCCH format. In Table 4, PUCCH formats 2a and 2b correspond to normal CP.

TABLE 4

| PUCCH format | Modulation scheme | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol position in RS | |
|---|---|---|
| | Normal CP | Extended CP |
| 1, 1a, 1b | 2, 3, 4 | 2, 3 |
| 2, 2a, 2b | 1, 5 | 3 |

FIG. 8 illustrates PUCCH formats 1a and 1b in case of normal CP. In PUCCH formats 1a and 1b, the same control information is repeated in a subframe on a slot-by-slot basis. ACK/NACK signals are respectively transmitted from UEs through different resources configured by different cyclic shifts (CSs) (frequency domain codes) and orthogonal cover codes (OCs or OCCs) (time domain spreading codes) of a computer-generated constant amplitude zero auto correlation (CG-CAZAC) sequence. An OC includes a Walsh/DFT orthogonal code, for example. If the number of CSs is 6 and the number of OCs is 3, a total of 18 UEs can be multiplexed in the same physical resource block (PRB) on a single antenna basis. Orthogonal sequences w0, w1, w2, w3 may be applied in the arbitrary time domain (after FFT modulation) or in the arbitrary frequency domain (prior to FFT modulation).

An ACK/NACK resource composed of CS, OC and PRB may be given to a UE through radio resource control (RRC) for SR and persistent scheduling. The ACK/NACK resource may be implicitly provided to the UE by the lowest CCE index of a PUCCH corresponding to a PDSCH for dynamic ACK/NACK and non-persistent scheduling.

FIG. 9 illustrates PUCCH formats 2/2a/2b in case of normal CP. Referring to FIG. 9, one subframe includes 10 QPSK data symbols in addition to RS symbols in case of normal CP. Each of the QPSK symbols is spread in the frequency domain by CS and then mapped to the corresponding SC-FDMA symbol. SC-FDMA symbol level CS hopping may be applied to randomize inter-cell interference. An RS may be multiplexed by CDM using CSs. For example, if the number of available CSs is 12 or 6, 12 or 6 UEs can be multiplexed in the same PRB. That is, a plurality of UEs can be multiplexed by CS+OC+PRB and CS+PRB in PUCCH formats 1/1a/1b and 2/2a/2b respectively.

Orthogonal sequences with length-4 and length-3 for PUCCH formats 1/1a/1b are shown in Table 7 and Table 8.

TABLE 7

Length-4 orthogonal sequences for PUCCH formats 1/1a/1b

| Sequence index $n_{oc}$ ($n_s$) | Orthogonal sequences $[w(0) \ldots w(N_{SF}^{PUCCH} - 1)]$ |
|---|---|
| 0 | [+1 +1 −1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}$ ($n_s$) | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequences for RS in PUCCH formats 1/1a/1b are shown in Table 9.

TABLE 9

| | 1a and 1b | |
|---|---|---|
| Sequence index $\bar{n}_{oc}$ ($n_s$) | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 10:
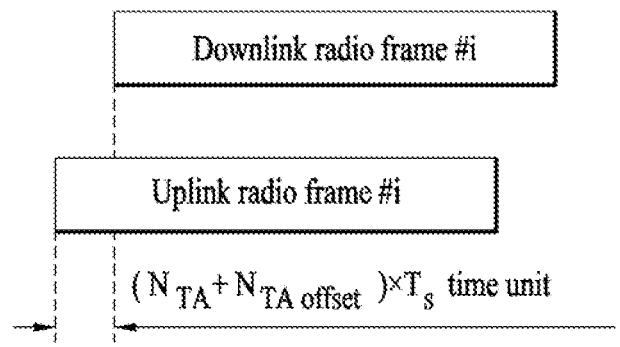
FIG. 10 illustrates uplink-downlink frame timing relation.

FIG. 10 illustrates uplink-downlink frame timing relation.

Referring to FIG. 10, transmission of the uplink radio frame number i starts prior to $(N_{TA}+N_{TAoffset})*T_s$ seconds from the start of the corresponding downlink radio frame. In case of the LTE system, $0 \leq N_{TA} \leq 20512$, $N_{TAoffset}=0$ in FDD, and $N_{TAoffset}=624$ in TDD. The value $N_{Taoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of 16 $T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command $T_A$ is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Figure 11:
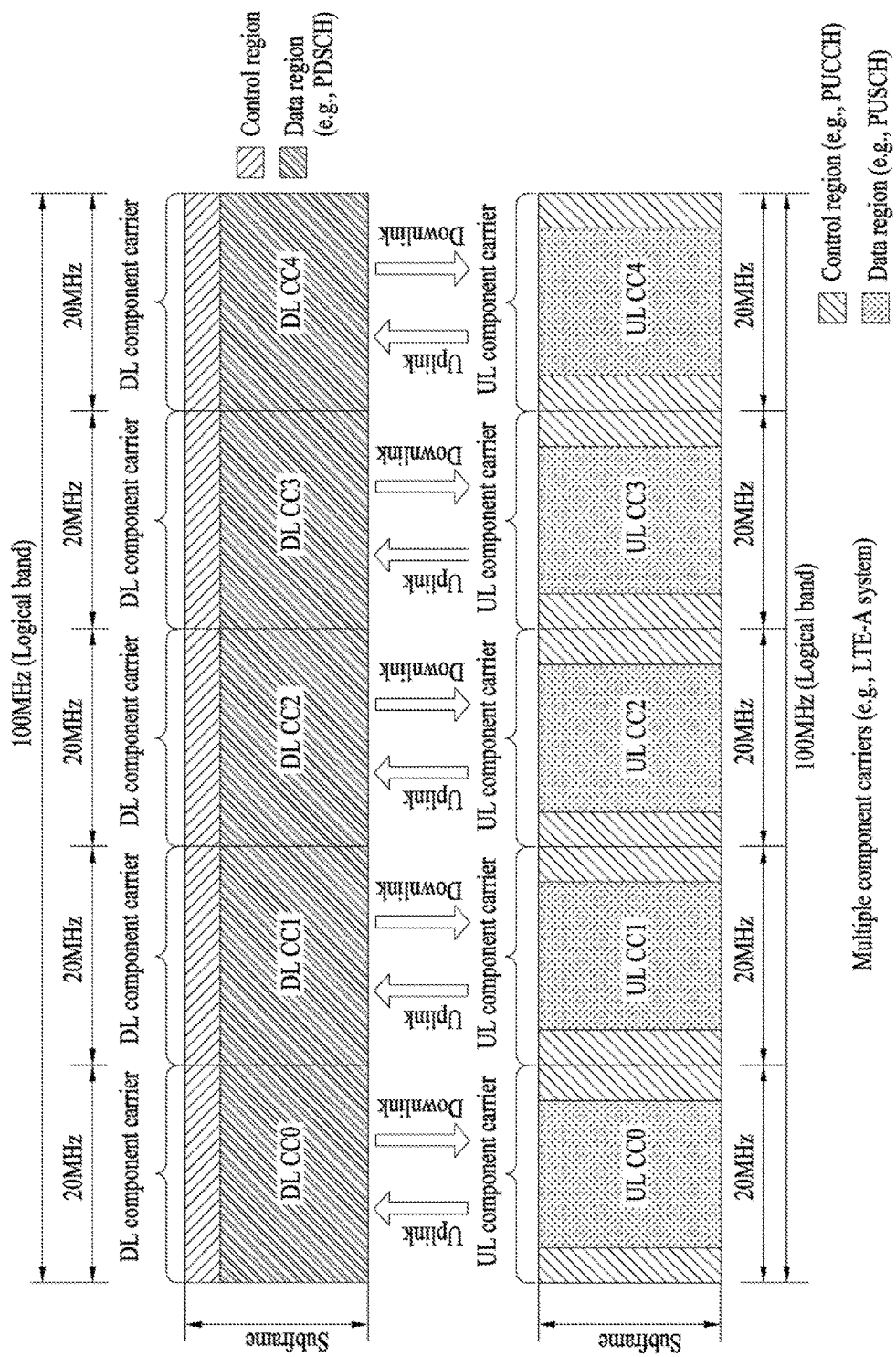
FIG. 11 illustrates a carrier aggregation (CA)-based wireless communication system.

FIG. 11 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 11, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.

CIF disabled: a PDCCH on a DL CC is used to allocate a PDSCH resource on the same DL CC or a PUSCH resource on a linked UL CC CIF enabled: a PDCCH on a DL CC can be used to allocate a PDSCH or PUSCH resource on a specific DL/UL CC from among a plurality of aggregated DL/UL CCs using the CIF When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 12:
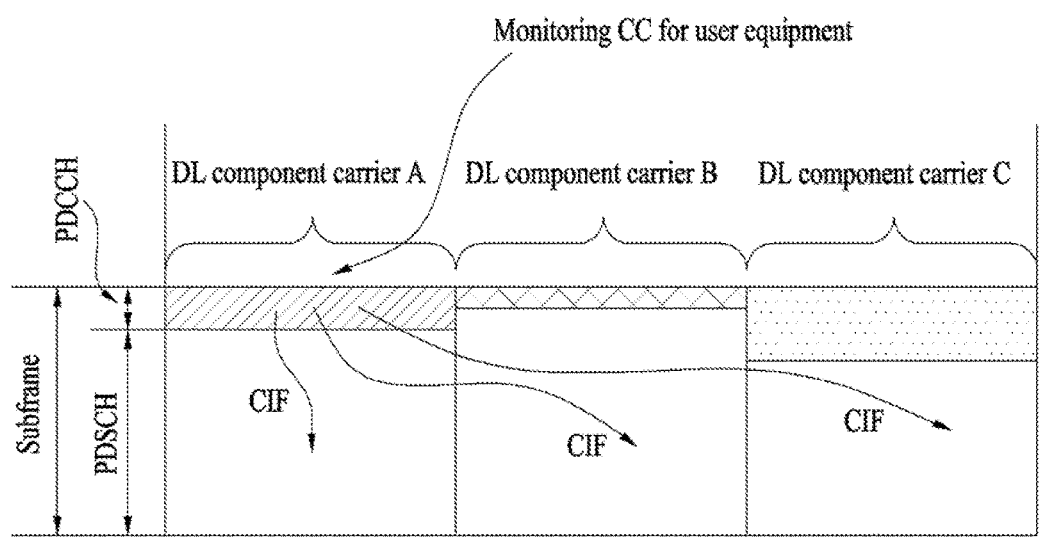
FIG. 12 illustrates a scheduling method when a plurality of cells is configured.

FIG. 12 illustrates cross-carrier scheduling. While the figure shows DL scheduling, cross-carrier scheduling is equally applied to UL scheduling.

Referring to FIG. 12, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

Embodiment: Control Information Allocation/Transmission During Dynamic Subframe Reconfiguration In the post-LTE system, an operation scheme for dynamically reconfiguring/changing a UL/DL SF direction for the purpose of performing enhanced interference mitigation and traffic adaptation (i.e., eIMTA) in a TDD status is considered. To this end, a method of configuring basic UL-DL configuration (UD-cfg) of a TDD cell (or CC) semi-statically using higher layer signaling (e.g., SIB) and then dynamically reconfiguring/changing operation UD-cfg of the corresponding cell (or CC) using lower layer signaling (e.g., L1 (Layer 1) signaling (e.g., PDCCH)) is considered. For convenience, basic UD-cfg will be referred to as SIB-cfg, and operation UD-cfg will be referred to as actual-cfg. Subframe configuration based on UD-cfg is based on Table 1. Also, in the present invention, a DL SF, a UL SF, and a special SF will be referred to as D, U and S, respectively.

In this regard, reconfiguration of D from D to U (or S) (D=>U (or S)) may not be easy or may be degraded when DL reception/measurement of a legacy UE based on a CRS in the corresponding D is considered, whereas reconfiguration from U (or S) to D (U (or S)=>D) may provide an eIMTA UE of additional DL resource as an eNB does not intentionally perform scheduling/configuration of a UL signal, which may be transmitted from the legacy UE through the corresponding U.

Considering this, actual-cfg may selectively be selected from UD-cfg (including SIB-cfg) which include all of Ds on SIB-cfg. That is, although UD-cfg in which Ds are all arranged in positions of D on SIB-cfg may be determined as actual-cfg, UD-cfg where U is arranged in a position of D on SIB-cfg cannot be determined as actual-cfg. Meanwhile, in eIMTA, reference UD-cfg (hereinafter, D-ref-cfg) may separately be configured by higher layer (signaling) to set HARQ timing (e.g., HARQ-ACK feedback transmission timing) for DL scheduling. Considering this, actual-cfg may selectively be determined from UD-cfgs (including D-ref-cfg) including all of U on D-ref-cfg. Therefore, UD-cfg where D is arranged in a position of U on D-ref-cfg cannot be determined as actual-cfg.

Therefore, D-ref-cfg may be configured as UD-cfg that includes all of Ds on possible actual-cfg candidates, and SIB-cfg may be configured as UD-cfg which include all of Us on possible actual-cfg candidates. That is, D-ref-cfg may be configured as D superset UD-cfg for possible actual-cfg candidates, and SIB-cfg may be configured as U superset UD-cfg for possible actual-cfg candidates. Reference UD-cfg (hereinafter, U-ref-cfg) of HARQ timing (e.g., UG/PUSCH/PHICH transmission timing) for UL scheduling may be configured as SIB-cfg. Therefore, U on D-ref-cfg may be considered as fixed U, and D on SIB-cfg may be considered as fixed D. Therefore, SF which is D on D-ref-cfg and U on SIB-cfg may be considered as flexible U which may be reconfigured/changed to U=>D. The flexible U may be reconfigured/changed to U=>D by actual-cfg.

That is, after SIB-cfg/D-ref-cfg is configured by higher layer (signaling), one of UD-cfg(s) which include all of Ds on SIB-cfg and all of Us on D-ref-cfg may be configured as actual-cfg by L1 signaling.

Meanwhile, even in an FDD system, eIMTA may be applied in such a manner that some UL SF on UL carrier is reconfigured as DL SF (and/or special SF). As an example, an operation method for (dynamically) reconfiguring/changing UL SF on UL carrier to specific TDD UL-DL configuration may be considered.

Figure 13:
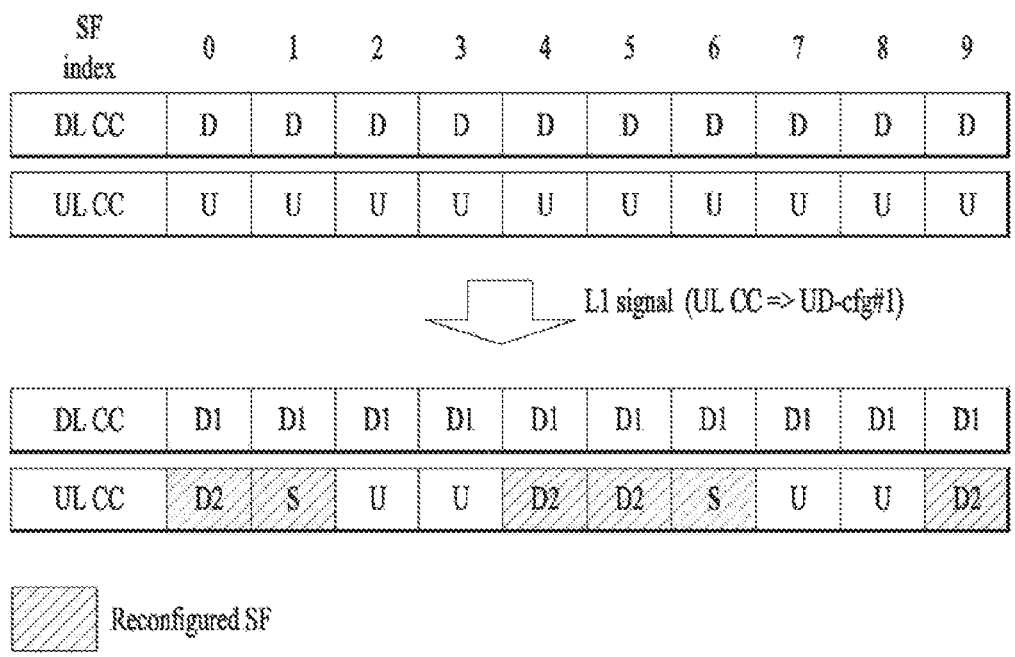

FIG. 13 illustrates FDD eIMTA scheme based on TDD UD-cfg. Referring to FIG. 13, UL resource of an FDD cell may dynamically be reconfigured using L1 signaling (e.g., PDCCH). In this example, it is assumed that SF configuration of UL CC is reconfigured in accordance with UD-cfg#1. Therefore, PDSCH transmission can be performed on UL CC, whereas PUSCH/PUCCH transmission is restricted. L1 signaling (e.g., actual-cfg indication information) for dynamic SF reconfiguration on UL CC may be signaled at a certain period. For convenience, in the following description, DL SF on DL CC will be referred to as D1, and reconfigured SF (i.e., SF reconfigured to UL SF=>DL SF or S SF) on UL CC will be referred to as D2.

When applying FDD eIMTA, it should be determined whether a prescribed transmission format (e.g., a modulation scheme, etc.) is appropriate to be used for a DL SF configuration, and together with the above, a (co-channel)

interference impact on an adjacent cell (and a regulatory condition for each frequency band to limit such an impact) and the like can be considered. For example, in a situation that 2 adjacent cells operate a same DL/UL CC pair, a case of applying an eIMTA scheme only to one of the two cells can be considered. In doing so, a cell 1 configures UL SF of an SC-FDM scheme on UL CC like an existing method, yet a cell 2 may configure DL SF of an OFDM scheme on the same UL CC based on an existing DL transmission format. In this case, the cell 1 may receive a strong interference due to an OFDM signal of the cell 2 in terms of UL reception. For this reason, an overall UL reception performance of the cell 1 may be considerably reduced.

Unlike the above, if DL SF is configured on UL CC based on a UL transmission format applying the SC-FDM scheme, an effective eIMTA operation can be performed while minimizing an (UL) interference impact on an adjacent cell if a slight inter-cell (base station) coordination is accompanied. For example, in the same situation as the above, by exchanging and adjusting specific information (e.g., timing advance, DMRS sequence information, etc.) between base stations beforehand, a UL signal (e.g., UL data on PUSCH) of the cell 1 and a DL signal (e.g., DL data on the PUSCH) of the cell 2 may be adjusted to be synchronized with and/or orthogonal to each other (in viewpoint of UL reception of the cell 1). Through this method, it is possible to reduce an inter-cell interference impact and perform the eIMTA operation at the same time. Herein, the synchronization of the UL/DL signals may mean that reception timings thereof enter CP in viewpoint of the UL reception of the cell 1. And, the orthogonality between the UL/DL signals may mean that their DMRSs are at least distinguished from each other (e.g., CDM).

Hereinafter, a method of configuring DL SF on UL CC based on a UL transmission format applying SC-FDM scheme for an FDD eIMTA operation will be proposed. According to a scheme of transmitting a DMRS used for a UL transmission format (e.g., PUSCH transmission) in DL SF, 2 Approaches (i.e., Approach 1 and Approach 2) can be considered. A DMRS in DL SF on UL CC may be: 1) transmitted in a similar manner to an existing DL CRS (or a transmission mode for performing DL data reception thereon) (i.e., transmitted on a full-band in each DL SF UE-commonly) (refer to FIG. 5); or 2) transmitted in a similar manner to an existing DL DMRS (or the transmission mode for performing DL data reception based thereon) (i.e., transmitted only on a DL SF/frequency band scheduled UE-specifically) (refer to FIG. 5).

In the following description, it is assumed that a DL data transmission on UL CC is set so as to be (cross-CC) scheduled from DL CC. Regarding a case that the DL data transmission on UL CC is (self-CC) scheduled from the corresponding UL CC, it will be described separately thereafter.

Inter-Cell (eNB) Coordination for FDD eIMTA

In a situation of applying an FDD eIMTA operation, specific informations may be exchanged between cells and adjusted through inter-eNB signaling to reduce an inter-cell interference impact by inter-cell synchronization and orthogonality (on UL CC). The specific information includes, for example, transmission timing information (e.g., timing advance) (of a base station) on DL SF (D2) configured on UL CC, configuration parameters (e.g., a base sequence, a sequence group, a cyclic shift, etc.) regarding DL RS (e.g., DMRS, SRS, etc.) transmitted (from the base station) in the DL SF (D2) CP length information (e.g., normal CP, extended CP) applied to the DL SF (D2), and the like.

Approach 1: UE-Common DMRS Transmission

In this scheme, a DMRS used for a UL transmission format (e.g., PUSCH) is transmitted from a base station to a user equipment through DL SF (D2) configured on UL CC through a full BW (bandwidth) of the corresponding UL CC in every DL SF in a UE-common manner. Herein, DMRS (D2) configuration information, for example, sequence/cyclic shift information configuring DMRS, an index of a DMRS transmission symbol in DL SF, the number/information of base station antenna ports and the like may be configured identical to parameters applied to an existing UL transmission (refer to FIG. 7). For example, DMRS (D2) may be mapped contiguously across the full BW in a fourth transmission symbol of each slot in every D2 on UL CC. Meanwhile, like FIG. 5, a DMRS (D1) transmitted through DL SF on DL CC is transmitted only in an SF/RB scheduled for data, and mapped by being distributed. Or, the DMRS (D2) configuration information, for example, the sequence/cyclic shift information configuring DMRS, the index of DMRS transmission symbol in DL SF, the number/information of base station antenna ports and the like may be set beforehand through an upper layer signaling (e.g., RRC (Radio Resource Control)).

In case of DL data transmitted through the DL SF (D2) on the UL CC, an RE mapping rule (e.g., time priority mapping) and a modulation scheme (e.g., SC-FDM with DFT-precoding) used for the UL transmission format (e.g., PUSCH) may be applied in the same manner. The DMRS (D2) may be used for the purposes of a reception/demodulation of DL data on the D2, a measurement/report on CSI (e.g., RI, PMI, CQI) and RRM (Radio Resource Management) (e.g., RSRP (Received Signal Received Power)), an RSRQ (Received Signal Received Quality), an RSSI (Received Signal Strength Indication)) regarding the D2, and/or the like. Meanwhile, in case of DL data transmitted through DL SF (D1) on the DL CC, an RE mapping rule (e.g., frequency priority mapping) and a modulation scheme (e.g., OFDM) used for a DL transmission format (e.g., PDSCH) may be applied in the same manner. To receive/demodulate the DL data on the D1, CRS/DMRS shown in FIG. 5 may be used, and for the purposes of a measurement/report on CSI (e.g., RI, PMI, CQI), RRM (e.g., RSRP, RSRQ, RSSI) regarding the D1 and the like, CRS/CSI-RS shown in FIG. 5 and FIG. 6 may be used.

Meanwhile, DMRS configured in the DL SF (D2) on the UL CC may also be transmitted through a plurality of (base station) antenna ports. In this case, at least one of a DMRS transmitted PRB (Physical RB) index, a sub-carrier index (e.g., transmission comb), a cyclic shift and an orthogonal cover code may be set different between DMRSs (D2) transmitted through different antenna ports. For example, a BW on the UL CC may be divided into a plurality of PRB sets, and each of the PRB sets may be allocated to a DMRS (D2) transmission of a corresponding antenna port. For example, each of the PRB sets may include a (A*n+B)th PRB. Herein, "A" indicates a gap between neighboring PRBs in a PRB set, and "B" indicates a PRB offset given according to the PRB set. "n" may be "0, 1, . . . , N−1", and "N" indicates the number of PRBs in the PRB set. A and B may be changed according to the number of antenna ports used for the DMRS (D2) transmission. For example, "A" may be "M (e.g., 2)", and "B" may have a value among "0, . . . , M−1" according to DMRS (D2) antenna port. Meanwhile, DMRS configured in the DL SF (D1) on the DL CC is mapped to a scheduled PRB all irrespective of an antenna port. For an inter-cell DMRS randomization, at least one of group hopping, sequence hopping and cyclic shift (slot) hopping may be applied to the DMRS (D2).

Meanwhile, in case of the DL data transmitted through the DL SF (D2) on the UL CC, DFT-precoding may be applied across a frequency band (i.e., an RB set) allocated to a corresponding data transmission (refer to SC-FDMA shown in FIG. 1). On the contrary, in case of DL data transmitted through the DL SF (D1) on the DL CC, the DFT-precoding is not performed on the frequency band (i.e., the RB set) allocated to the corresponding data transmission. In addition, in case of a DMRS transmitted through the DL SF (D2) on the UL CC, a DMRS sequence may be generated by a unit of a single RB or specific N RBs. Herein, "N" may be set to the number of base station transmission antenna ports or a multiple of the number in consideration of FDM between base station transmission antenna ports. Or, a value of "N" may be set directly by the base station through an upper layer signaling (e.g., RRC). On the other hand, in case of a DMRS transmitted through the DL SF (D1) on the DL CC, a DMRS sequence is generated on the basis of a full BW of the DL CC, and then mapped to a PRB having a scheduled portion of an entire DMRS sequence.

Meanwhile, in case of a resource allocation (i.e., RA) for DL data transmission/scheduling in DL SF (D) configured on UL CC, the following methods can be considered. If the following method "1)" is used for the DL data transmission/scheduling in the D2, the user equipment may differently interpret resource allocation information in DCI according to whether DL data is scheduled on a prescribed one of DL CC and UL CC. On the other hand, if the following method "2)" is used for the DL data transmission/scheduling in the D2, the user equipment may interpret the resource allocation information in the DCI according to a DL RA type irrespective of whether the DL data is scheduled on a prescribed CC.

1) An RA scheme (e.g., type 0 (a compact RIV (Resource Indication Value)) or type 1 (e.g., a non-contiguous RGB (Resource Block Group) cluster) applied to an existing UL PUSCH scheduling may be used. Type-0 RA allocates a single contiguous RB set, and the resource allocation information in DCI includes an RIV indicating a start RB and length of the RB set. Type-1 RA allocates 2 non-contiguous RBG sets, and the resource allocation information includes a combinatorial index indicating a start RBG and an end RBG of each of the RBG sets.

2) An RA scheme (e.g., type 0 (RBG bitmap), type 1 (RBG subset bitmap), or type 2 (compact RIV)) applied to an existing DL PDSCH scheduling may be used. Type-0 RA allocates a resource by RBG unit, and resource allocation information in DCI includes a bitmap in which each bit indicates a presence or non-presence of allocation of a corresponding RBG. Type-1 RA allocates a resource in a RBG subset by RB unit, and the resource allocation information in the DCI includes RBG subset indication information and a bitmap indicating a resource allocation by RB unit. Type-2 RA allocates a single contiguous RB set, and the resource allocation information in DCI includes RIV indicating a start RB and length of the RB set.

Approach 2: UE-Specific DMRS Transmission

In this scheme, a DMRS used for a UL transmission format (e.g., PUSCH) is transmitted only through a DL SF/frequency resource (e.g., a (contiguous) RB set) on which DL data is scheduled from a base station to a user equipment through DL SF (D2) configured on UL CC in a UE-specific manner. Herein, DMRS (D2) configuration information, for example, sequence/cyclic shift information configuring DMRS, an index of a DMRS transmission symbol in DL SF, the number/information of base station antenna ports and the like may be configured identical to parameters applied to an existing UL transmission (refer to FIG. 7). For example, DMRS (D2) may be contiguously mapped only in an RB set having DL data transmitted in a $4^{th}$ transmission symbol of each slot within DL SF having DL data transmitted therein. Meanwhile, like FIG. 5, DMRS (D1) transmitted through DL SF on DL CC is transmitted only in an SF/RB scheduled for data, and mapped by being distributed. And, the DMRS (D2) configuration information, for example, the sequence/cyclic shift information configuring DMRS, the index of DMRS transmission symbol in DL SF, the number/information of base station antenna ports and the like may be set beforehand through an upper layer signaling (e.g., RRC). And, a cyclic shift value applied to the DMRS (D2) or information for inferring such a value may be signaled UE-specifically through DCI having transmitted for DL data scheduling (e.g., explicit signaling through a DMRS cyclic shift field or implicit signaling according to another field value (combination)). And, the number/information of base station antenna ports can be UE-specifically signaled through DCI in a similar manner.

In case of DL data transmitted through DL SF (D2) on UL CC, an RE mapping rule and a modulation scheme used for a UL transmission format (e.g., PUSCH) may be identically applied. Herein, DMRS (D2) is used only for a reception and modulation of DL data (D2). And, a channel measurement on DL SF on UL CC may be performed using a separate RS, as described below, or inferred indirectly using an uplink channel measurement on the UL CC.

A DMRS configured in DL SF (D2) on UL CC may also be transmitted through a plurality of (base station) antenna ports. In this case, between DMRSs (D2) transmitted through different antenna ports, at least one of a DMRS transmitted PRB (Physical RB), a sub-carrier index (e.g., transmission comb), a cyclic shift and an orthogonal cover code may be set different. For example, a BW on UL CC may be divided into a plurality of PRB sets, and each of the PRB sets may be allocated to a DMRS (D2) transmission of a corresponding antenna port. For example, each of the PRB sets may include a $(A*n+B)^{th}$ PRB. Herein, "A" indicates a gap between neighboring PRBs in a PRB set, and "B" indicates a PRB offset given according to the PRB set. "n" may be "0, 1, . . . , N−1", and "N" indicates the number of PRBs in the PRB set. "A" and "B" may be changed according to the number of antenna ports used for the DMRS (D2) transmission. For example, "A" may be "M (e.g., 2)", and "B" may have a value among "0, . . . , M−1" according to the DMRS (D2) antenna port. Meanwhile, all DMRS configured in DL SF (D1) on DL CC is mapped to PRB scheduled irrespective of an antenna port. For an inter-cell DMRS randomization, at least one of group hopping, sequence hopping, and cyclic shift (slot) hopping may be applied to the DMRS (D2).

Meanwhile, in case of DL data transmitted through DL SF (D2) on UL CC, DFT-precoding may be applied across a frequency band (i.e., an RB set) allocated to a corresponding data transmission (refer to SC-FDMA shown in FIG. 1). On the other hand, in case of DL data transmitted through DL SF (D1) on DL CC, DFT-precoding is not performed across a frequency band (i.e., RB set) allocated to a corresponding data transmission. In addition, in case of DMRS transmitted through DL SF (D2) on UL CC, a DMRS sequence may be generated in accordance with a length of an RB section allocated to DL data transmission. On the other hand, in case of DMRS transmitted through DL SF (D1) on DL CC, a DMRS sequence is generated with reference to a full BW of the DL CC, and then mapped to a PRB having a scheduled portion of overall whole DMRS sequence.

In the present scheme, the RA scheme applied to the existing UL PUSCH scheduling or the existing DL PDSCH scheduling for DL data transmission/scheduling in a DL SF configured on UL CC may also be used as described in Approach 1.

Meanwhile, in Approach 1 and Approach 2, an SRS used for UL channel sounding may be transmitted from a base station to a user equipment through DL SF (D2) configured on UL CC with a specific period in a UE-common manner. Herein, SRS (D2) configuration information, for example, sequence/cyclic shift information for configuring SRS, a transmission comb, a transmission period, an index of a SRS transmission symbol in DL SF and the like may be configured identical to parameters applied to an existing UL transmission (refer to FIG. 7). For example, SRS (D2) may be transmitted in a last transmission symbol of a second slot in a closet DL SF (D2) after an SF corresponding to a transmission period on the UL CC. The SRS (D2) may be mapped to an even-numbered sub-carrier or an odd-numbered sub-carrier on a SRS transmission band according to a transmission comb. Meanwhile, as shown in FIG. 5 and FIG. 6, a CRS/CSI-RS transmitted through DL SF on DL CC is transmitted across a full BW in every SF/periodically, and mapped by being distributed within the corresponding SF.

The SRS (D2) may be used for the purposes of a measurement/report on CSI and RRM regarding the DL SF (D2) configured on the UL CC. DL data may not be mapped to a transmission symbol having the SRS transmitted in the DL SF (D2). And, an SRS configured in the DL SF (D2) on the UL CC may be transmitted through a plurality of (base station) antenna ports as well. In this case, between SRSs (D2) transmitted through different antenna ports, at least one of a DMRS transmitted PRB index, a sub-carrier index (e.g., transmission comb), SF timing, and a cyclic shift applied to SRS can be set different. For example, a BW on UL CC may be divided into a plurality of PRB sets, and each of the PRB sets may be allocated to an SRS (D2) transmission of a corresponding antenna port. For example, each of the PRB sets may include a (A*n+B)th PRB. Herein, "A" indicates a gap between neighboring PRBs in a PRB set, and "B" indicates a PRB offset given according to the PRB set. "n" may be "0, 1, . . . , N−1", and "N" indicates the number of PRBs in the PRB set. "A" and "B" may be changed according to the number of antenna ports used for the SRS (D2) transmission. For example, "A" may be "M (e.g., 2)", and "B" may have a value among "0, . . . , M−1" according to an SRS (D2) antenna port. Meanwhile, an SRS configured in the DL SF (D1) on the DL CC shares a PRB set irrespective of an antenna port, and transmission comb and/or cyclic shift is set different according to the antenna port. For an inter-cell SRS randomization, at least one of group hopping, sequence hopping and cyclic shift (slot) hopping may be applied to the DMRS (D2).

In case of an SRS transmitted periodically through DL SF (D2) configured on UL CC, since the signal is transmitted from a base station to a user equipment for a CSI/RRM measurement usage and a report usage regarding the DL SF (D2), it may be transmitted on a full BW of the corresponding UL CC through a single timing (e.g., transmission timing). And, by considering a resource to be used for an interference measurement usage, a zero-power SRS may be configured with a specific period (across the full BW). Between SRSs (D) (and/or SRSs (D) transmitted for different usages), at least one of a PRB index, a sub-carrier index and an SF timing may be set different.

In case of SRS (D), an SRS sequence may be generated by a unit of a single RB or specific N RBs. Herein, "N" may be set to the number of base station transmission antenna ports or a multiple of the number in consideration of FDM between the base station transmission antenna ports. Or, a value of "N" may be directly set by the base station through an upper layer signaling (e.g., RRC).

DL Self-Scheduling on UL CC for FDD eIMTA

If a DL data transmission on UL CC is set so as to be (e.g., self-CC) scheduled from the corresponding UL CC, it may be preferable to transmit DCI using transmission symbol(s) (e.g., 2 transmission symbols, that is, 2nd and 3rd transmission symbols or 5th and 6th transmission symbols in a slot) adjacent to a DMRS transmission symbol (e.g., a $4^{th}$ transmission symbol in the slot) for an effective transmission and stable performance of DCI for scheduling DL data. And, for an early decoding of DCI, it may be effective to transmit the DCI by (firstly) using a symbol having a lowest symbol index among DMRS adjacent symbols in terms of complexity/delay. According to a DCI coding rate (reduction) (corresponding to a CCE aggregation level of PDCCH), a search space for DCI detection (capable of having various coding rates) may be configured in form of additionally using a symbol having a next lowest symbol index. For example, if a transmission symbol index in a slot starts from "0", a transmission symbol #1 and a transmission symbol #2 may be preferentially used for DCI transmission, and if a DCI coding rate is low, a transmission symbol #4 and a transmission symbol #5 may be additionally used. Hence, the user equipment may attempt DCI detection in the transmission symbol #1 and the transmission symbol #2, and subsequently attempt DCI detection in the transmission symbols #1, #2, #4, and #5. Namely, a plurality of subsets may be configured from the transmission symbols #1, #2, #4, and #5, and each of the subsets may be configured as a search space for a DCI detection usage. DCI may be set so as to be transmitted only in a first slot, or in both two slots of a subframe. A frequency band for the DCI detection may be limited to a portion of a full BW, which may be allocated through an upper layer (e.g., RRC) signaling or an L1 signaling for indicating SF reconfiguration on UL CC.

As another method, it may be effective to transmit DCI using a symbol closest to a DMRS transmission symbol (e.g., $4^{th}$ transmission symbol in a slot) preferentially in terms of control information reliability/overhead. For example, a $3^{rd}$ transmission symbol and a $5^{th}$ transmission symbol in the slot are preferentially used for DCI transmission, and a $2^{nd}$ transmission symbol and a $6^{th}$ transmission symbol may be preferentially used according to a DCI coding rate (reduction). In this case, according to the DCI coding rate (reduction) (corresponding to CCE aggregation level of PDCCH), a search space for DCI detection (capable of having various coding rates) may be configured in form of additionally using a symbol having a next closest symbol index. For example, if a transmission symbol index in the slot starts from "0", a transmission symbol #2 and a transmission symbol #4 may be preferentially used for DCI transmission, and if the DCI coding rate is low, a transmission symbol #1 and a transmission symbol #5 may be additionally used. Hence, a user equipment may attempt DCI detection in the transmission symbol #2 and the transmission symbol #4, and subsequently attempt the DCI detection in the transmission symbols #1, #2, #4 and #5. Thus, a plurality of subsets may be configured from the transmission symbols #1, #2, #4, and #5, and each of the subsets may be configured as a search space for a DCI detection usage. DCI may be set so as to be transmitted only in a first slot, or in both two slots of a subframe. A frequency band for the DCI detection may be limited to a portion of a full BW, which may be allocated through upper layer (e.g., RRC) signaling or L1 signaling for indicating SF reconfiguration on UL CC.

Or, based on a specific PUCCH format transmitted (from a base station) through DL SF on UL CC or a PUSCH type of a specific RB size (e.g., 1 RB), a DL grant DCI for scheduling DL data transmission (for a user equipment) in the corresponding DL SF may be configured/transmitted. In this case, a PUCCH resource (e.g., a PUCCH resource index set) or a PUSCH resource (e.g., an RB set) for the DCI transmission may be allocated through upper layer (e.g., RRC) signaling or L1 signaling for indicating SF reconfiguration on UL CC.

Meanwhile, even if DL data transmission on UL CC is set so as to be (self-CC) scheduled by the corresponding UL CC, a UL data transmission on UL CC may be set so as to be (cross-CC) scheduled from DL CC. Namely, DL/UL data transmission on a single same CC may be set so as to be scheduled from different CCs. In this regard, a user equipment may perform only a DL DCI detection operation in DL SF (D2) on UL CC, and omit a UL DCI detection operation. On the other hand, the user equipment may perform both of the DL DCI detection operation and the UL DCI detection operation in DL SF (D1) on DL CC. This DL/UL scheduling setting method may be identically applied to an FDD eIMTA situation of configuring DL SF on UL CC based on an existing DL transmission format of applying an OFDM scheme as well.

DL Power Allocation on UL CC for FDD eIMTA

DL signal transmission allocation in an existing DL SF based on an OFDM scheme including DL CC may be determined by the following parameters.

P_R: A CRS RE transmission power (linear average in [W])

P_A: A ratio ([dB]) of a PDSCH RE transmission power in a transmission symbol for not transmitting CRS to a CRS RE transmission power P_B: A ratio ([dB]) of PDSCH RE transmission power in a transmission symbol for transmitting CRS to a CRS RE transmission power P_C: A ratio ([dB]) of PDSCH RE transmission power (in a transmission symbol for not transmitting CRS) to a CRS-RS RE transmission power In particular, a base station determines a DL transmission power per RE. A user equipment assumes that a CRS RS EPRE (Energy Per Resource Element) (i.e., P_R) is uniform across a DL full BW, and that until receiving new CRS power information, the CRS RS EPRE is uniform across all subframes. The CRS RS EPRE can be inferred on the basis of a parameter (e.g., a Reference Signal Power) provided by upper layer (e.g., RRC) signaling. A ratio of PDSCH EPRE to CRS RS EPRE (i.e., PDSCH EPRE/CRS RS EPRE) is set different in consideration of CRS distribution. For example, one of P_A and P_B may be determined by inferring from the parameter provided by the upper layer (e.g., RRC) signaling, and the other may be determined using the ratio thereof. For example, P_A/P_B may have various values such as "1, 4/5, 3/5, 2/5" according to the CRS distribution (e.g. the number of antenna ports).

Based on the above, DL power allocation in a DL SF configured on UL CC may be performed by defining/setting parameters for Approach 1 and Approach 2 as shown below. The aforementioned parameters, that is, parameters P_Rxx, P_Axx and P_Bxx proposed below may be substituted with P_R, P_A and P_B, respectively.

Method 1-1 for Approach 1

P_R11: DMRS RE transmission power

P_A11: A ratio ([dB]) of PDSCH RE transmission power in a transmission symbol for not transmitting DMRS to a DMRS RE transmission power P_B11: A ratio ([dB]) of PDSCH RE transmission power in a transmission symbol for transmitting DMRS to a DMRS RE transmission power Note: If DL data is not mapped to a DMRS transmission symbol, a definition/setting of P_B11 can be omitted.

Note: If there is no path-loss measurement through DMRS reception power, a definition/setting of P_R11 can be omitted.

Method 1-2 for Approach 1

P_R12: DMRS RE transmission power

P_A12: A ratio of a PDSCH RE transmission power (in a temporary transmission symbol) to a DMRS RE transmission power Note: If there is no path-loss measurement through DMRS reception power, a definition/setting of P_R12 can be omitted.

Method 2-1 for Approach 2

P_R21: SRS RE transmission power

P_A21: A ratio of a PDSCH RE transmission power in a transmission symbol for not transmitting SRS to a SRS RE transmission power P_B21: A ratio of a PDSCH RE transmission power in a transmission symbol for transmitting SRS to a SRS RE transmission power Note: If DL data is not mapped to an SRS transmission symbol, a definition/setting of P_B21 can be omitted.

Note: If there is no path-loss measurement through SRS reception power, a definition/setting of P_R21 can be omitted.

Method 2-2 for Approach 2

P_R22: SRS RE transmission power

P_A22: A ratio of a PDSCH RE transmission power (in a temporary transmission symbol) to an SRS RE transmission power Note: If there is no path-loss measurement through SRS reception power, a definition/setting of P_R22 can be omitted.

In case of the above methods (in particular, Method 1-1 and Method 1-2 for Approach 1), such methods are also extensively applicable to a power allocation for a D2D transmission signal in a D2D (Device-to-Device) transmission SF configured on UL CC (FDD) or UL SF (TDD) in a similar manner. For example, an RS used for D2D signal reception/demodulation may be substituted for the DMRS in Approach 1, and a D2D transport channel (for carrying D2D scheduling control information and/or D2D data) may be substituted for the PDSCH in Approach 1. In doing so, a D2D transmission power allocation parameter may be signaled as shown below.

1) The base station may signal to both a D2D transmitting user equipment/and a D2D receiving user equipment.

2) The base station may signal only to the D2D transmitting user equipment, and the D2D transmitting user equipment may forward it to the D2D receiving user equipment.

Or, 3) In a state that the base station sets only an upper limit of a power usable for D2D transmission for the D2D transmitting user equipment, the D2D transmitting user equipment may signal a value self-determined within a range that does not exceed the upper limit to the D2D receiving user equipment.

Meanwhile, in case of an FDD eIMTA for configuring DL SF on UL CC based on an existing DL transmission format for applying an OFDM scheme, the following methods may be considered according to a presence or non-presence of a CRS transmission in the corresponding DL SF.

1) If the CRS transmission is included, parameter values of P_R, P_A, P_B, and P_C (according to the above-defined form) may be set (independently from a parameter value applied to DL CC).

2) If the CRS transmission is included, all or a portion of the parameters P_R, P_A, P_B, and P_C may be set/succeeded (e.g., separately setting a parameter value that is not succeeded) to be identical to a value applied to the DL CC.

Or, 3) if the CRS transmission is not included (or only CSI-RS is used as a user equipment-common RS), the CSI-RS may be substituted for the SRS in Method 2-1 and Method 2-2.

If a path-loss measurement through a CRS reception power on UL CC is not required in "1)" and "2)", a setting of P_R on the UL CC may be omitted.

Meanwhile, in case of a codebook for an MIMO precoding (and a corresponding CSI feedback) in DL SF (D2) (on UL CC) configured in an existing UL transmission format based on a SC-FDM scheme, it can be determined as follows. If the following Approach "1)" is used for the MIMO precoding (and the corresponding CSI feedback) in D2, the user equipment may differently apply a codebook for an MIMO signal processing (and the corresponding CSI feedback) regarding DL data according to whether DL data/DL RS is received on a prescribed one of DL CC and UL CC. Namely, if the DL data/DL RS is received on the DL CC, the user equipment may perform the MIMO signal processing (and the corresponding CSI feedback) regarding the DL data using the existing codebook used for DL. On the other hand, if the DL data/DL RS is received on the UL CC, the user equipment may perform the MIMO signal processing (and the corresponding CSI feedback) regarding the DL data using the existing codebook used for UL. Subsequently, if the following Approach "2)" is used for the MIMO precoding (and the corresponding CSI feedback) in the D2, the user equipment may perform the MIMO signal processing (and the corresponding CSI feedback) regarding the DL data by applying the existing codebook used for DL irrespective of whether the DL data/DL RS is received on a prescribed CC.

1) In spite of DL transmission from the base station, since an SC-FDM signal is used, the codebook used for the existing UL may be applied. Or, 2) in spite of SC-FDM transmission, since it is a transmission from a base station having fewer PAPR related restrictions, the existing codebook used for DL may be applied.

On the basis of the determined codebook, a corresponding precoding and feedback operation (e.g., user equipment's PMI (Precoding Matrix Index) selection, base stations's T-PMI (Transmitted PMI) indication, etc.) may be performed.

In a situation that an FDD eIMTA operation is applied, it is necessary to configure a special SF for DL-to-UL switching from an SC-FDM based DL SF to an SC-FDM based UL SF. The special SF is configured between DL SF (D2) and UL SF on UL CC. If a DwPTS section in the special SF is set small (e.g., configured with 3 or less SC-FDM symbols) so as not to include any DMRS transmission symbol (e.g., a $4^{th}$ SC-FDM symbol in a slot) at all, the following methods can be considered.

1) A single DMRS transmission symbol may be transmitted using a specific transmission symbol (e.g., having a highest index) within the corresponding DwPTS section. Or, 2) the corresponding DwPTS section may be included in a DL data scheduling target region regarding DL SF (D2) before the special SF. Namely, in case of DL data scheduled for the corresponding DL SF, the DL data may be transmitted across the corresponding DL SF and the DwPTS section both. Or, a method of configuring a special SF to enable a DwPTS symbol section to always include at least one of DMRS transmission symbols (e.g., to be configured with 4 or more SC-FDM symbols) can be considered.

The proposed methods of the present invention may not be limited to the FDD eIMTA only, and may be similarly and extensively applicable to a TDD eIMTA scheme in form of reconfiguring/reorganizing UL SF into DL SF (or S SF) on a single CC having both DL SF and UL SF configured thereon.

Figure 14:
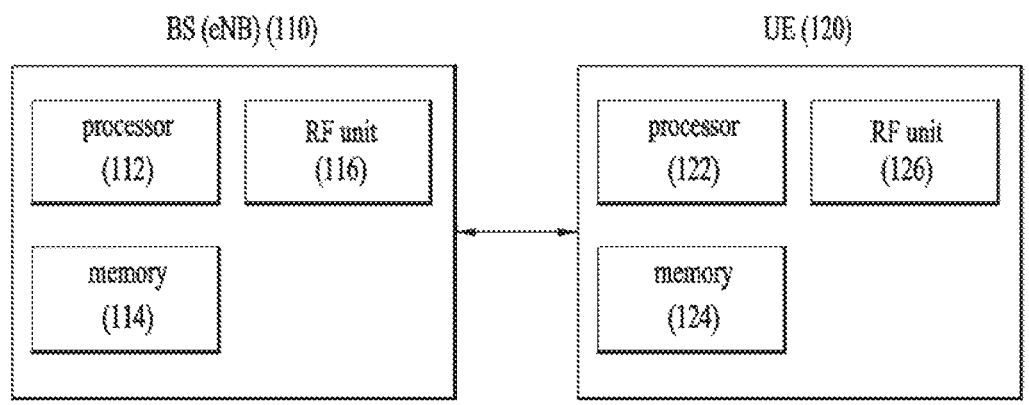
FIG. 14 illustrates a base station and a user equipment applicable to an embodiment of the present invention.

FIG. 14 illustrates a BS and a UE of a wireless communication system, which are applicable to embodiments of the present invention. When the wireless communication system includes a relay, the BS or UE can be replaced by the relay.

Referring to FIG. 14, a wireless communication system includes a BS 110 and a UE 120. The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a UE, a BS or other devices (e.g., relay0 in a wireless mobile communication system. Specifically, the present invention is applicable to a method for transmitting control information and an apparatus therefor.

What is claimed is:

1. A method for a user equipment (UE) to receive a Downlink (DL) signal through a Frequency Division Duplex (FDD) cell including an Uplink (UL) Component Carrier (CC) and a DL CC in a wireless communication system, the method comprising:
receiving, from a base station (BS), Subframe (SF) reconfiguration information about the UL CC,
wherein the SF reconfiguration information includes information on a reconfigured DL SF set on the UL CC, and
wherein the reconfigured DL SF set includes SFs reconfigured from UL SFs to DL SFs on the UL CC, based on the SF reconfiguration information; and
receiving, from the BS, a Physical Downlink Shared Channel (PDSCH) signal on the DL CC or the UL CC included in the FDD cell,
wherein when the PDSCH signal is received from the BS via DL SF on the DL CC, the PDSCH signal received from the BS is processed based on an Orthogonal Frequency Division Multiplexing (OFDM) scheme, and
wherein when the PDSCH signal is received from the BS via a reconfigured DL SF included in the reconfigured DL SF set on the UL CC, the PDSCH signal received from the BS is processed based on a Single Carrier-Frequency Division Multiplexing (SC-FDM) scheme of a UL transmission format.

2. The method of claim 1, wherein when the PDSCH signal is received via the DL SF on the DL CC, a Demodulation Reference Signal (DMRS) for the PDSCH signal is mapped by being distributed within the DL SF, and
wherein when the PDSCH signal is received via the reconfigured DL SF on the UL CC, the DMRS for the PDSCH signal is mapped contiguously to a specific transmission symbol in the reconfigured DL SF.

3. The method of claim 2, further comprising:
receiving a Physical Downlink Control Channel (PDCCH) including scheduling information for the PDSCH signal,
wherein when the PDCCH is received via the DL SF on the DL CC, the PDCCH is mapped to at least one first transmission symbol in the DL SF, and
wherein when the PDCCH is received via the reconfigured DL SF on the UL CC, the PDCCH is mapped to an adjacent transmission symbol of the specific transmission symbol having the DMRS contiguously mapped thereto in the reconfigured DL SF.

4. The method of claim 1, further comprising:
receiving a Channel State Information-Reference Signal (CSI-RS) on the DL CC or the UL CC included in the FDD cell,
wherein when the CSI-RS is received via the DL SF on the DL CC, the CSI-RS is mapped by being distributed within the DL SF, and
wherein when the CSI-RS is received via the reconfigured DL SF on the UL CC, the CSI-RS is mapped to a last transmission symbol in the reconfigured DL SF.

5. A user equipment (UE) configured to receive a Downlink (DL) signal through a Frequency Division Duplex (FDD) cell including an Uplink (UL) Component Carrier (CC) and a DL CC, the UE comprising:
a transceiver; and
at least one processor,
wherein the at least one processor is configured to:
control the transceiver to receive, from a base station (BS), Subframe (SF) reconfiguration information about the UL CC, and
control the transceiver to receive, from the BS, a Physical Downlink Shared Channel (PDSCH) signal on the DL CC or the UL CC included in the FDD cell,
wherein the SF reconfiguration information includes information on a reconfigured DL SF set on the UL CC,
wherein the reconfigured DL SF set includes SFs reconfigured from UL SFs to DL SFs on the UL CC, based on the SF reconfiguration information,
wherein when the PDSCH signal is received from the BS via DL SF on the DL CC, the PDSCH signal received from the BS is processed based on an Orthogonal Frequency Division Multiplexing (OFDM) scheme, and
wherein when the PDSCH signal is received from the BS via a reconfigured DL SF included in the reconfigured DL SF set on the UL CC, the PDSCH signal received from the BS is processed based on a Single Carrier-Frequency Division Multiplexing (SC-FDM) scheme of a UL transmission format.

6. The UE of claim 5, wherein when the PDSCH signal is received via the DL SF on the DL CC, a Demodulation Reference Signal (DMRS) for the PDSCH signal is mapped by being distributed within the DL SF, and
wherein when the PDSCH signal is received via the in the reconfigured DL SF on the UL CC, the DMRS for the PDSCH signal is mapped contiguously to a specific transmission symbol in the reconfigured DL SF.

7. The UE of claim 6, wherein the at least one processor is further configured to control the transceiver to receive a Physical Downlink Control Channel (PDCCH) including scheduling information for the PDSCH signal,
   wherein when the PDCCH is received via the DL SF on the DL CC, the PDCCH is mapped to at least one first transmission symbol in the DL SF, and
   wherein when the PDCCH is received via the reconfigured DL SF on the UL CC, the PDCCH is mapped to an adjacent transmission symbol of the specific transmission symbol having the DMRS contiguously mapped thereto in the reconfigured DL SF.

8. The UE of claim 5, wherein the at least one processor is further configured to control the transceiver to receive a Channel State Information-Reference Signal (CSI-RS) on the DL CC or the UL CC included in the FDD cell,
   wherein when the CSI-RS is received via the DL SF on the DL CC, the CSI-RS is mapped by being distributed within the DL SF, and
   wherein when the CSI-RS is received via the reconfigured DL SF on the UL CC, the CSI-RS is mapped to a last transmission symbol in the reconfigured DL SF.

* * * * *